Patented June 10, 1930

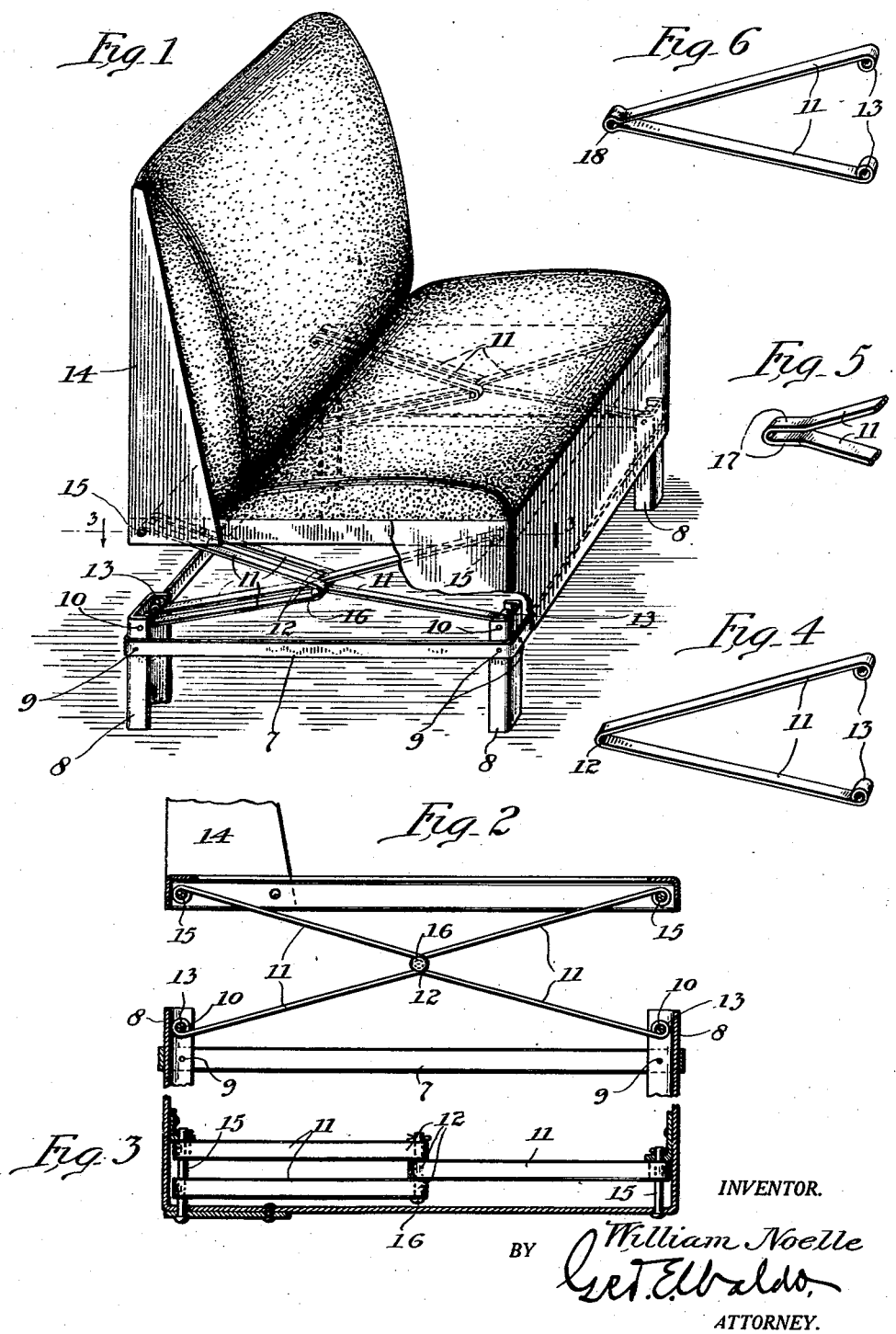

1,762,788

UNITED STATES PATENT OFFICE

WILLIAM NOELLE, OF CHICAGO, ILLINOIS, ASSIGNOR OF ONE-HALF TO HERMAN WERNICKE, OF CHICAGO, ILLINOIS

SEAT CONSTRUCTION

Application filed June 4, 1928. Serial No. 282,724.

The invention relates to improvements in seat constructions especially adapted for use in motor buses or the like, the primary object of the invention being to provide an improved spring mounting for such seats which is of simple construction and highly efficient in use.

Another object of the invention is the provision of a spring mounting for such seats which affords ample resiliency and strength and is capable of economical manufacture.

Other objects will appear hereinafter.

The invention consists in the combinations and arrangements of parts hereinafter described and claimed.

The invention will be best understood by reference to the accompanying drawings forming a part of this specification and in which—

Fig. 1 is a perspective view of a seat construction embodying the invention;

Fig. 2, an enlarged transverse section illustrating one of the spring mountings for one end of said seat;

Fig. 3, a horizontal section taken substantially on line 3—3 of Fig. 1;

Fig. 4, a detail perspective view of one of a plurality of spring members employed in the construction;

Fig. 5, a perspective view of a portion of a modified form of spring member; and Fig. 6, a perspective view of still another modified form of spring member.

The form of construction illustrated in Figs. 1, 2, 3 and 4 comprises a suitable support in the form of a rectangular frame 7 supported on four short legs 8 in the form of short sections of channel irons, each arranged with its open side inwardly and secured to the frame member 7 by means of the rivets 9 as shown.

A pivot pin 10 is arranged transversely across the top of each of the channel legs 8 and the spring members are pivotally mounted on these pins. Each of the spring members consists of a leaf or strip spring 11 doubled upon itself centrally to form a bight or loop 12 thereby providing two divergent spring arms as shown.

The divergent spring arms are provided at their ends with pivot eyes 13 adapted and arranged to pivotally engage the pins 10. A spring mounting is arranged at each end of the construction as indicated and each of said spring mountings comprises two of the spring members secured to the rear pin 10 and extending thence forwardly under the corresponding end of the seat member 14 substantially parallel to each other. A single spring member is mounted on the forward pin 10 extending thence rearwardly with its bight or looped portion 12 fitting between the rearward springs as shown. The upper arms of the spring members are similarly mounted on pivot pins 15 on the underside of the seat member 14 and a central pivot pin 16 is passed between the adjacent pivot bights 12 of said springs as shown and whereby the inner ends of the springs are secured together so as to be capable of movement relatively to each other. By this arrangement a simple and effective spring mounting is provided for each end of the seat member which will afford ample resiliency and strength and is capable of economical manufacture.

In the modified form of construction indicated in Fig. 5, the spring members are provided with bights or loops 17 having parallel sides and whereby the pivot pin 16 will be held in place during the normal operation or flexing of the springs without rattling.

In the form of construction illustrated in Fig. 6, the bights or loops 18 of each of the springs are formed into an eye as shown to receive the pivot pin 16. By this arrangement the inner ends of the springs are pivotally secured together so that there can be no play of the pivot pins in the bights or loops of the springs and actual flexing or bending of the arms of the springs is compelled. This arrangement also prevents rattling of the pivot pin and will be found to increase the stiffness and rigidity of the construction.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims. For example, while I consider the arrangement of the springs 11 herein shown and described—in which they are applied closely adjacent to the ends of the seat 14 and are pivoted substantially at the corners of the seat—as preferably for most purposes, I do not desire to limit myself to this construction and arrangement, as my invention contemplates equally, as an equivalent construction, positioning the springs at a greater or less distance from the ends of the seat member, which would bring the pivots for said springs at a corresponding distance from the corners of the seat member. Also, my invention contemplates the use of more than two sets of springs, if desired, particularly in the case of long seat members, designed to seat a considerable number of people.

I claim:

1. A seat construction comprising a base; a seat member arranged above said base; and a spring mounting for said seat member consisting of spaced sets of springs, each set consisting of a plurality of springs doubled between their ends to form divergent arms and comprising springs, opposite ends of which, respectively, are connected to opposite sides of said base and seat member, and the looped portions of which project inwardly toward each other and are so proportioned that the loops therein, respectively, will overlap, and a pin which engages the loops of the springs of each set of springs and flexibly connects the same.

2. A seat construction comprising a base; a seat member arranged above said base; and a spring mounting for said seat member consisting of spaced sets of springs, each set consisting of a plurality of springs doubled between their ends to form divergent arms and comprising springs, opposite ends of which, respectively, are pivotally connected to opposite sides of said base and seat member, and the looped portions of which project inwardly toward each other and are so proportioned that the loops therein, respectively, will overlap, and a pin which engages the loops of the springs of each set of springs and flexibly connects the same.

3. A seat construction as specified in claim 1, in which opposed springs of each set are so proportioned that through the pin which connects the loops therein, respectively, each will limit the bodily throw of the seat member both forwards and backwards.

4. A seat construction as specified in claim 1, in which each spaced set of springs comprises spaced parallel springs applied for supporting the rear side of the seat member, and a spring member applied for supporting the front side of said seat member, the loop which connects the divergent arms of which extends between the loops of said first mentioned springs and is flexibly connected to both by the connecting pin.

5. A seat constructed as specified in claim 2, in which the base of the seat consists of a rigid, substantially rectangular frame and legs therefor consisting of channel-bar sections rigidly secured to the front and rear frame members with their open sides disposed inwardly, and the means for pivotally connecting the leaf springs to said base consists of pivot pins secured in the flanges of said channel-shaped legs and which extend across the space defined thereby and engage eyes formed at the end of the divergent arms of said leaf springs.

In witness that I claim the foregoing as my invention, I affix my signature this 31 day of May, A. D. 1928.

WILLIAM NOELLE.